United States Patent [19]

McDonald et al.

[11] Patent Number: 5,290,843
[45] Date of Patent: Mar. 1, 1994

[54] PHENOLIC RESINS FOR REINFORCED COMPOSITES

[75] Inventors: Roderick A. McDonald, Bothell; Mark J. Knudsen, Seattle, both of Wash.

[73] Assignee: Georgia-Pacific Resins, Inc., Atlanta, Ga.

[21] Appl. No.: 53,137

[22] Filed: Apr. 29, 1993

[51] Int. Cl.$^5$ .............................. C08K 7/14; C08K 3/38

[52] U.S. Cl. ...................................... 524/405; 428/117; 428/312.6; 428/436; 528/138; 524/493; 524/494; 524/701

[58] Field of Search ............... 524/405, 493, 494, 701; 528/138; 428/117, 312.6, 389.8, 436

[56] References Cited

U.S. PATENT DOCUMENTS

| | | |
|---|---|---|
| 1,999,715 | 4/1935 | Billings et al. |
| 2,606,888 | 8/1952 | Williams et al. |
| 2,748,101 | 5/1956 | Shappell. |
| 2,864,782 | 12/1958 | Mitchell. |
| 2,889,241 | 6/1959 | Gregory et al. |
| 2,941,904 | 6/1960 | Stalego. |
| 2,990,307 | 6/1961 | Stalego. |
| 3,218,279 | 11/1965 | Stalego. |
| 3,332,911 | 7/1967 | Huck. |
| 3,510,446 | 5/1970 | Junger et al. |
| 3,616,179 | 10/1971 | McCombs et al. |
| 3,839,236 | 10/1974 | Foley et al. |
| 3,846,225 | 11/1974 | Stalego. |
| 3,875,089 | 4/1975 | Hofel et al. |
| 3,956,204 | 5/1976 | Higginbottom. |
| 4,043,970 | 8/1977 | Dahms. |
| 4,045,398 | 8/1977 | Dahms ................................ 428/436 |
| 4,120,847 | 10/1978 | Culbertson ........................ 428/436 |
| 4,122,045 | 10/1978 | Garrett et al. |
| 4,122,054 | 10/1978 | Culbertson. |
| 4,123,414 | 10/1978 | Milette. |
| 4,157,324 | 6/1979 | Culbertson. |
| 4,176,105 | 11/1979 | Miedaner. |
| 4,195,458 | 4/1980 | Hoppe et al. |
| 4,235,989 | 11/1980 | Leong et al. |
| 4,272,403 | 6/1981 | Meyer et al. |
| 4,299,947 | 11/1981 | Nanjo et al. |
| 4,323,667 | 4/1982 | Meyer et al. |
| 4,403,076 | 9/1983 | McDonald. |
| 4,480,068 | 10/1984 | Santos et al. |
| 4,578,448 | 3/1986 | Brode et al. |
| 4,584,329 | 4/1986 | Gardziella et al. |
| 4,820,576 | 4/1989 | Duryea. |
| 4,824,896 | 4/1989 | Clarke et al. |
| 4,917,742 | 4/1990 | Watanabe et al. ................. 428/117 |
| 4,977,209 | 12/1990 | Barker et al. |
| 4,985,489 | 1/1991 | Barker et al. |
| 5,004,789 | 4/1991 | Boinot et al. ..................... 524/405 |
| 5,019,618 | 5/1991 | Chiu ................................. 524/405 |
| 5,032,431 | 7/1991 | Conner et al. |

FOREIGN PATENT DOCUMENTS

| | | |
|---|---|---|
| 927041 | 5/1973 | Canada. |
| 1055637 | 1/1967 | United Kingdom. |

OTHER PUBLICATIONS

John W. Lyons, "The Chemistry and Uses of Fire Retardants", Wiley-Interscience, pp. 80-83 (Scientific Library, U.S. Patent Office (Jan. 31, 1972)).

Military Specification—Resin, Phenolic, Laminating, MIL-R-9299C, (Dec. 3, 1968).

Chemical Abstracts—CA81(24):153931b.

Chemical Abstract: CA81(6):27526k.

Chemical Abstract: CA73(4):15919n.

Chemical Abstract: CA104(4):20140q.

Primary Examiner—Veronica P. Hoke
Attorney, Agent, or Firm—Banner, Birch, McKie & Beckett

[57] ABSTRACT

The present invention is directed to a phenolic resin composition useful for preparing a binder for reinforced composites, to a binder for reinforced composites made using the phenolic resin composition, and to a reinforced composite made using the binder. The phenolic resin composition of the present invention contains an aqueous mixture of: (a) a resole formed by reacting phenol with formaldehyde in the presence of an ortho directing catalyst at a mole ratio of formaldehyde to phenol ranging from about 0.7:1 to about 3:1 and (b) a water-soluble borate, wherein the composition contains at least about 0.02 equivalent of the ortho directing catalyst per mole of phenol, has a pH at least about 7 and contains from about 0.02 to about 0.5 mole borate per mole of phenol. When the ortho directing catalyst has a cation that forms an insoluble material with a borate anion, the cation is removed after the resole is formed and prior to adding the water-soluble borate.

23 Claims, 2 Drawing Sheets

FIG. 2

PHENOLIC RESINS FOR REINFORCED COMPOSITES

BACKGROUND OF THE INVENTION

1. Field of the Invention

This invention relates to a phenolic resin composition useful for preparing reinforced composites. The present invention particularly relates to a resole-type phenolic resin prepared using an ortho directing catalyst and containing a borate salt which is useful for preparing reinforced composites. The resole resins of the present invention possess superior water dilutability and storage stability, reduced volatile emissions upon curing, and excellent compressive strengths, and flexural strength when used to make reinforced composites. The reinforced composites may use inorganic and/or organic fibers, which may be chopped, non-woven or woven, and honeycombed materials as the reinforcing materials, e.g. to form prepregs which are laminated and cured, and cured honeycomb composites for various conventional applications, particularly those requiring excellent flame and smoke properties.

2. Description of the Prior Art

Phenolic resins have long been employed as binders for use with glass fibers in the preparation of fiber reinforced composites. Glass fibers which may be chopped, non-woven or woven are coated or saturated with the aqueous binder solution, usually by dipping or spraying, and passed through an oven where they are compressed to the desired thickness and density, and then permanently fixed by heat setting or curing the resin binder. Phenolics are preferred over many other polymer systems, such as polyesters and epoxies, due to their well known excellent resistance to flame and smoke generation. Thus, their use in the aerospace, mass transit, and other applications requiring excellent flame and smoke properties is expected to grow. However, environmental considerations have directed the composite industry away from the solvent-based phenolic resins. Efforts to employ water-based phenolics have previously resulted in problems with reduced strengths and poor water dilutability during storage.

The properties desired of binder compositions depend to a large extent on the properties of the basic resin. A good binder composition should above all be easily applied and capable of covering and/or bonding the reinforcing components, e.g. fibers and honeycombs, and at the same time it should cause little pollution. Further, the resin should have good long term stability and a high degree of dilutability with water. Since the concept of dilutability is particularly important, it will be defined for the purposes of the present invention as follows: The water dilutability of a resin solution is the volume of de-ionized water which can be added at a given temperature to one unit volume of this solution without producing any permanent perturbation, i.e., haze, clouding or precipitation.

Of particular interest are high efficiency single phase aqueous phenolformaldehyde resins which have low free phenol and low free formaldehyde. Such resins retain a high percentage of the organic moiety when the resin is cured. However, free phenol and free formaldehyde volatilize in the curing of the resin causing pollution considerations and also reducing the efficiency and performance of the resin in various bonding applications. Accordingly, it is necessary that the resin should be as free as possible from any unconverted starting materials or residues thereof while preserving its useful qualities. The risk of atmospheric pollution is in fact mainly due to the presence of volatile monomers. These consist, for example, the starting materials required for producing the resin, e.g. formaldehyde and phenol, which have been left unconverted by the reaction or regenerated in the course of binding the fibers or subsequently.

The utilization of boron compounds in hardenable polymeric binder materials, and in particular the binder which are based on phenol-formaldehyde condensation products is known. It is also generally known that such boron compounds are useful in imparting flame retarding properties to such condensation products. See U.S. Pat. Nos. 2,941,904, 2,990,307 and 3,218,279 to Stalego and U.S. Pat. No. 4,176,105 to Miedaner.

U.S. Pat. No. 4,480,068 to Santos et al. discloses that prior art attempts to employ borates in sufficient quantities needed to give improved thermal resistance have frequently resulted in resins which exhibit poor storage stability and poor tensile strength. The reason for this seems to be that the addition of larger amounts of boric acid disrupts the cure properties of the binder and, thus, affects the final strength of the bonds which are formed. In Santos, these disadvantages are overcome by using a special binder. The binder is prepared in an aqueous medium by mixing (1) a mixture of boric acid and a soluble hydroxyl compound, (2) a nitrogen containing compound, and (3) a phenol-formaldehyde resole modified with urea, then (4) adjusting the pH to 8.5-9.5.

According to U.S. Pat. No. 2,748,101 to Shappell, boric acid may be used to improve aging characteristics and water dilutability of an alkali metal catalyzed phenol-formaldehyde resin.

The prior art also discloses the use of boron containing compounds as catalysts or accelerator for phenol-aldehyde resins. See U.S. Pat. No. 2,606,888 to Williams et al. (novolac); U.S. Pat. No. 2,864,782 to Mitchell (phenolic, melamine and urea resins); U.S. Pat. No. 3,839,236 to Foley et al. (tertiary condensation product of phenol, formaldehyde and a silane); U.S. Pat. No. 4,584,329 to Gardziella et al. (phenol-aldehyde); and British Pat. No. 1,055,637 (phenolic resin). In U.S. Pat. No. 3,332,911 to Huck, boric acids or borate salts of divalent electropositive metals which are above hydrogen in the electromotive series are used as catalysts in both novolac preparation and curing stages.

The prior art also discloses the use of boron containing compounds as emulsifiers or viscosity enhancers. See U.S. Pat. No. 1,999,715 to Billings et al. (borax as an emulsifying agent); U.S. Pat. No. 2,889,241 to Gregory et al. (boric acid as a thickener); and U.S. Pat. No. 4,824,896 to Clarke et al. (borax as a thickener and to improve bonding at lower press time). In U.S. Pat. No. 4,123,414 to Milette, boric anhydride is used as a hydrophilous inorganic compound. However, to avoid the viscosity increase associated by adding the boric anhydride to the resole beforehand, the method thereof involves simultaneously projecting into a mold a resole resin, glass reinforcing elements, an acid catalyst and boric anhydride.

Various references directly or inferentially teach away from the use of electropositive divalent metals as condensation catalysts in the preparation of phenolaldehyde resins if boron containing compounds are to be included therein. For example, U.S. Pat. No. 2,748,101 to Shappell discloses suitable condensation catalysts are those that do not form water-insoluble borate salts or complexes upon the addition of boric acid thereto. Barium hydroxide and calcium hydroxide are disclosed as unsatisfactory catalysts, in that they yield insoluble products with boric acid. Alkali catalyzed phenol-formaldehyde resins are also used in U.S. Pat. No. 4,480,068 to Santos et al. which also adds boric acid. U.S. Pat. No. 4,985,489 to Barker et al. discloses that catalysts such as zinc acetate are less desirable because they yield resins having a mixed bridging structure containing ortho-ortho benzylic ether bridges and ortho-para methylene bridges which reduces the desired capacity of the resin for complexing with the oxyanions, e.g. borate ions. Molecules in which the phenolic residues are linked by ortho-ortho methylene bridges have very few sites for complexing with oxyanions, and it is therefore desirable that such molecules be absent, or if present, present in relatively small numbers. The oxyanions form a stable complex with the resin when carbon dioxide gas is passed through the formed articles containing the resin and oxyanions, thereby curing the resin. When zinc acetate was used, the properties, e.g. compression strength, of the binders were inferior to those of similar binders obtained using alkali catalyzed resole phenol-formaldehyde resins due to the reduced capacity in the zinc acetate catalyzed resins for complexing with borate ions.

U.S. Pat. No. 5,032,431 to Conner et al. discloses a phenolic resole composition useful in a glass fiber insulation binder. The binder is an aqueous mixture of a phenolformaldehyde resole, a water-soluble-borate and optionally a silane coupling agent. The resole is prepared using alkali metal hydroxides, alkali metal carbonates and tertiary amines as suitable condensation catalysts. Such catalysts promote para-para and ortho-para condensation and discourage ortho-ortho condensation. However, like the prior art, this system suffers from increases in viscosity when increasing amounts of the water-soluble borate is added thereto.

The present invention is based on the discovery that the addition of a proper amount of a water-soluble borate compounds to a phenolic resole resin in which the aldehyde groups are predominately substituted ortho to the phenolic hydroxyls (forming ortho methylol phenols) results in products with unexpectedly increased water dilutability even at pH values in the range of 7 to 8.5. Such phenolic resins will also accommodate higher borate contents without the large viscosity increases observed with the practice of the prior art, particularly Conner et al. Dramatic reductions in volatile emissions during cure were also obtained as well as large increases in compressive strengths and flexural strength measured on glass fiber reinforced laminates prepared using the resins of the present invention.

DISCLOSURE OF THE INVENTION

The present invention is directed to a phenolic resin composition useful for preparing a binder for reinforced composites, to a method for preparing the phenolic resin composition, to a binder for reinforced composites made using the phenolic resin composition, and to a reinforced composite made using the binder.

The present invention relates to a method for preparing a phenolic resole resin composition comprising:
 (a) reacting a phenol, preferably phenol itself, with an aldehyde, preferably formaldehyde, in the presence of an ortho directing catalyst at a mole ratio of formaldehyde to phenol ranging from about 0.7:1 to about 3:1, preferably from about 1.0:1 to about 1.8:1, and
 (b) adding or forming in situ a water-soluble borate, wherein said composition contains at least about 0.02 equivalent of the ortho directing catalyst per mole of phenol, has a pH at least about 7 and contains from about 0.02 to about 0.5 mole borate per mole of phenol, preferably from about 0.04 to about 0.35 mole borate per mole of phenol. When the ortho directing catalyst is an electropositive divalent metal catalyst, an anion which renders the divalent metal cation insoluble is added and the insoluble product removed prior to adding the water soluble borate to the composition.

The phenolic resin composition of the present invention comprises an aqueous mixture of:
 (a) a resole formed by reacting phenol with formaldehyde in the presence of an ortho directing catalyst at a mole ratio of formaldehyde to phenol ranging from about 0.7:1 to about 3:1, preferably from about 1.0:1 to about 1.8:1, and
 (b) a water-soluble borate,
wherein said composition contains at least about 0.02 equivalent of the ortho directing catalyst per mole of phenol, has a pH at least about 7 and contains from about 0.02 to about 0.5 mole borate per mole of phenol, preferably from about 0.04 to about 0.35 mole borate per mole of phenol.

A reinforced composite binder according to the present invention comprises a mixture of the above-described phenolic resin composition with conventional additives such as flexibility and toughening agents such as rubbers, polyamides and other thermoplastics, and coupling agents such as silane coupling agents, said mixture having a pH at least about 7.

The present invention also relates to a method of making a reinforced composite which comprises:
 (1) coating inorganic and/or organic reinforcing components, e.g. chopped, woven and/or non-woven inorganic and/or organic fibers, with an aqueous binder composition having a pH at least about 7 comprising an aqueous mixture of:
  (i) a resole formed by reacting phenol with formaldehyde in the presence of an ortho directing catalyst at a mole ratio of formaldehyde to phenyl ranging from about 0.7:1 to about 3:1, preferably from about 1.0:1 to about 1.8:1, and
  (ii) a water-soluble borate,
 wherein said composition contains at least about 0.02 equivalent of the ortho directing catalyst per mole of phenol, has a pH at least about 7 and contains from about 0.02 and about 0.5 mole borate per mole of phenol, preferably from about 0.04 to about 0.35 mole borate per mole of phenol;
 (2) drying said coated reinforcing component with minimal curing of said binder (i.e., to a B-stage) to form a prepreg; and
 (3) applying pressure and heat to said prepreg to cure said dried binder into a matrix forming said composite.

Alternatively, prior to applying pressure and heat, a layered composite may be formed by (3) layering a plurality of said prepregs to form a layered structure; and (4) then applying pressure and heat to said layered structure to cure said dried binder into a matrix forming said composite.

The present invention also relates to a method of making a reinforced composite which comprises:

(1) coating an inorganic and/or organic honeycombed reinforcing component with an aqueous binder having a pH at least about 7 comprising an aqueous mixture of:

(i) a resole formed by reacting phenol with formaldehyde in the presence of an ortho directing catalyst at a mole ratio of formaldehyde to phenol ranging from about 0.7:1 to about 3:1, preferably from about 1.0:1 to about 1.8:1, and (ii) a water-soluble borate, wherein said composition contains at least about 0.02 equivalent of the ortho directing catalyst per mole of phenol, has a pH at least about 7 and contains from about 0.02 and about 0.5 mole borate per mole of phenol, preferably from about 0.04 to about 0.35 mole borate per mole of phenol;

(2) curing the binder coating on said coated reinforcing component;

(3) repeating steps (1) and (2) until a desired cured binder content in said honeycombed reinforcing member is achieved forming said composite.

The honeycombed reinforcing component is typically of a stretchable material. Accordingly, the honeycombed reinforcing component is stretched to the desired extent and shape prior to the coating step. Once the coating and curing steps are completed (i.e., step (3) above is completed), the stretching force on the reinforcing component is released with the cured binder imparting rigidity and strength thereto and thereby maintaining the reinforcing component in its stretched shape.

The present invention further relates to a reinforced composite made in accordance with these methods.

The phenolic resins useful in the practice of the invention are characterized in the art as phenol-aldehyde resole resins. Phenol-aldehyde resole resins are well known in the art and are thermosetting phenol-aldehyde type resins consisting primarily of partially condensed phenol alcohols. The phenolic resole resin of the present invention is prepared by reacting an aldehyde, e.g. formaldehyde, with a phenol, e.g. phenol itself, for example, under basic reaction conditions or mildly acidic conditions (e.g. with zinc acetate). Contrary to the prior art, an ortho directing catalyst is used and required. Formaldehyde is used in an amount of between about 0.7 and about 3 moles per mole of phenol. Accordingly, in the lower mole ratios (i.e., about 0.7:1 to less than 1:1), the resole contains excess phenol. Preferably, about 1.0 to about 1.8 moles of formaldehyde per mole of phenol is used. As used in the art, the term "resole" refers to phenolic resins that contain useful reactivity (thermosetting), as opposed to cured resins or resins that do not contain useful reactivity. At this stage, the product is fully soluble in one or more common solvents, such as alcohols and ketones, and is fusible at less than 150° C.

The catalyst used in preparing the resoles of the present invention is critical and must be a catalyst which is ortho directing. Such catalysts are well known in the art. In one embodiment, the catalyst has an electropositive divalent metal cation. After the condensation reaction, but prior to the addition of the soluble boron-containing compound, the cation is removed by use of various separation procedures such as extraction or precipitation with an anion to form an insoluble salt. If not removed, the divalent metal may react with the boron-containing compound forming an insoluble salt or complex, e.g. a precipitate, and interfering with beneficial aspects of adding the boron-containing compound. After removal thereof, the pH is adjusted by adding a base such as alkali metal hydroxides such as lithium hydroxide, sodium hydroxide and potassium hydroxide; alkali metal carbonates such as sodium carbonate and potassium carbonate; and tertiary amines. Based on considerations of cost and availability, sodium hydroxide is used most often. The boron-containing compound is then added.

Ortho directing catalysts are well known in the art and include the oxide or organic acid salt of a divalent electropositive metal such as $Zn^{++}$, $Mg^{++}$, $Mn^{++}$, $Ca^{++}$, and $Co^{++}$ or mixtures thereof. See U.S. Pat. Nos. 4,122,054 and 4,157,324 to Culbertson, incorporated herein by reference. Divalent electropositive metals of oxides or hydroxides or organic acid salts employed in accordance with the invention are calcium ($Ca^{++}$), barium ($Ba^{++}$), strontium ($Sr^{++}$), magnesium ($Mg^{++}$), zinc ($Zn^{++}$), manganous ($Mn^{++}$) manganese, cadmium ($Cd^{++}$), cobaltous ($Co^{++}$) cobalt and plumbous ($Pb^{++}$) lead. Examples of such organic acid salts include water-soluble salts of an organic monocarboxylic acid with a metal of the transition elements of the Periodic Chart of Elements, such as zinc, manganese, cobalt, nickel, iron, and chromium. Such salts may be represented by the formula:

$$(C_nH_{2n+1}COO)_xM$$

wherein n is an integer from 0 to 10, x is greater than 1 and M is a metal having an atomic number from 21 to 30. See metal carboxylate catalysts disclosed in U.S. Pat. No. 4,235,989 to Leong et al., incorporated herein by reference.

In an alternate embodiment, an ortho directing borate catalyst is used. Basic conditions are established and maintained during the reaction by adding a base having an electropositive mono-valent cation. There is no need for a scavenger for the mono-valent metal cation as a precipitate is not formed and the in situ formation of borate of the mono-valent metal is desired.

Suitable bases for use with the ortho directing borate catalysts for preparing phenolic resole resins and establishing and maintaining basic conditions during the reaction are any of those known in the art having the mono-valent metal cation. Typical bases include alkali metal hydroxides such as lithium hydroxide, sodium hydroxide and potassium hydroxide; alkali metal carbonates such as sodium carbonate and potassium carbonate; and tertiary amines. Preferably, the bases are alkali metal hydroxides, for instance, sodium hydroxide, lithium hydroxide and potassium hydroxide. Based on considerations of cost and availability, sodium hydroxide is used most often.

Accordingly, the high ortho resole resins of the present invention may be prepared, for example, by use of an ortho directing catalyst containing a divalent metal cation or an ortho directing borate catalyst. The former method requires the removal of the divalent cation (e.g.

Zn++, such as when zinc acetate is used) prior to adding the borate while the latter does not require that processing step. In either case, additional mon-valent cation base such as those identified above may be added to achieve the desired pH level. During the initial reaction of the phenol and formaldehyde, only that amount of catalyst or catalysts necessary to produce a phenolic resin need be added to the reaction mixture. Together with the present disclosure, the determination of suitable amounts of the ortho directing catalyst for preparing a phenolic resin for a particular end use is within the skill of those skilled in the art. Typically, at least about 0.02 equivalent of the catalyst per mole of phenol is used, with an amount between about 0.07 and about 0.3 equivalent per mole of phenol being more usual. Usually, no more than about 0.6 equivalent of catalyst per mole of phenol should be added. By "one equivalent" as that term is used above is that amount of the ortho directing catalyst relative to or corresponding to one mole of hydroxyl. Accordingly, one equivalent of an ortho directing divalent metal catalyst corresponds to 0.5 mole of the catalyst and one equivalent of an ortho directing mono-valent catalyst corresponds to 1 mole of the catalyst. Normally, the catalyst is added incrementally to the reaction mixture in two or more portions, although the complete amount can be added when initiating the reaction. The formaldehyde reactant is added to the condensation reaction usually as an aqueous solution containing from about 30 to about 55 weight percent or more of formaldehyde, or in a polymeric form such as paraformaldehyde. It is to be understood that formaldehyde may also be added to the reaction in the form of other substances capable of providing free formaldehyde under the conditions described herein. The full complement of the formaldehyde source can be present at the start of the reaction or it can be added incrementally or metered into the reaction mixture during the course of the reaction.

Although the composition of the invention is defined in terms of formaldehyde and the use of formaldehyde is preferred, it is well known in the art that other aldehydes such as acetaldehyde, paraldehyde, glyoxal, propionic aldehyde, butyraldehyde, isobutyraldehyde, isopentaldehyde, furfural, 2-ethylhexanal, ethylbutyraldehyde, heptaldehyde, benzaldehyde, crotonaldehyde and the like can be substituted for formaldehyde in phenol-formaldehyde resins. Preferably, the aldehyde should have not more than 8 carbon atoms and should not detrimentally affect the resinification of the resin. Preferred aldehydes are those having from 1 to 4 carbon atoms, such as formaldehyde, which may be in aqueous solution (e.g. 30 percent or higher), or in any of its low polymeric forms such as paraformaldehyde or trioxane. These other aldehydes and mixtures thereof may be used in place of formaldehyde or in partial substitution thereof; but preferably, formaldehyde in one of its commercially available forms is used. The use of other aldehydes is, therefore, contemplated for use in preparing compositions of the present invention.

Examples of phenols which can be used in preparing a phenol-aldehyde resole for use in practicing the invention include ortho-, para-directing hydroxy or amino aromatic compounds having 6 to 24 carbon atoms such as phenol itself ($C_6H_5OH$), naphthol, anthranol and substituted derivatives thereof where the substituents on the aromatic compound are independently selected from hydrogen; halogen, such as Cl, Br, and F; $NH_2$; and hydrocarbon radicals, such as:

a. alkyl groups or radicals of 1 to 12 carbon atoms, preferably of 1 to 9 carbon atoms, and their various isomeric forms and substituted on the aromatic nucleus in the ortho- or para-position;
b. cycloalkyl groups of 5 to 12 carbon atoms such as cyclohexyl, cyclopentyl, methylcyclohexyl, butylcyclohexyl, and so forth;
c. aryl ketonic groups wherein the hydrocarbon portion is as defined below in (e);
d. alkyl, aryl and cycloalkyl carboxylic groups wherein the hydrocarbon part is defined as above in (a) and (b);
e. aryl groups of 6 to 24 carbon atoms such as phenyl, naphthyl, anthryl, and the like;
f. aryl substituted alkyl wherein the aryl is phenyl which may contain lower alkyl and/or hydroxy substituents so that the resulting hydroxy aromatic is, for example, a bisphenol;
g. the oxyhydrocarbon radicals corresponding to the foregoing hydrocarbon radicals; and
h. mixtures of the aforesaid hydroxy aromatics.

Suitable substituted phenols include meta-cresol, m-propyl phenol, m-isobutyl phenol, m-sec-butyl phenol, m-tert-butyl phenol; m-bromo phenol, m-chloro phenol, m-phenyl phenol, m-benzyl phenol, m-cetyl phenol, m-cumyl phenol, m-hydroxyacetophenone, m-hydroxybenzophenone, m-d-limonene phenol. The corresponding phenols substituted in the ortho- and para-positions can be used in part but are not preferred.

Mixtures of various hydroxy aromatic compounds mentioned herein also may be used.

Included among the phenolic reactants which may be used are those known as the "cresylic acids" and these often comprise heterogeneous mixtures having two reacting hydrogen positions on each of them; that is, compounds unsubstituted in the ortho- and para-positions, and hence, yield relatively unreactive resins. These compounds may include the following: 3,5-xylenol, m-cresol, 3,4-xylenol, 2,5-xylenol, 2,3-xylenol, phenol, p-cresol, o-cresol, 2,4-xylenol, and 2,6-xylenol. Cresylic acids or tar acids may include phenol and its homologs which may include cresols, xylenols, trimethyl phenols, ethyl phenols, and higher boiling materials such as dihydroxy phenols, polycyclic phenols and the like. They are often obtained by a low-temperature trimerization of coal, lignite, and the like, or a conventional high-temperature coke oven tar, or the liquid product of petroleum cracking both thermo and catalytic, shell oil, coal hydrogenation products, and the like.

Polyhydroxyaromatic reactants, such as resorcinol, may also be used. Also useful in this invention are mixtures of aniline and phenol to react with an aldehyde or ketone to produce a resole. Additionally, sodium lignosulfonate may also be substituted for a portion of the phenol.

Though not preferred, also useful in the invention are mixtures of urea and phenol to react with the aldehyde or ketone to produce a resole.

Preferably, the phenols suitable for use in the invention are phenol per se or substituted phenols or mixtures thereof, more preferably phenol itself. Such phenols can be represented by the formula:

$$C_6H_{5-a}(OH)(X)_a$$

where "X" is a monovalent radical such as an alkyl, cycloalkyl, aryl, alkaryl, aralkyl, alkoxy, halogen and the like and "a" is from 0 to 3, and wherein at least two of the ortho- and para-positions relative to the hydroxy group are free. Preferably an ortho-position should be free. Most preferably the substituents should be in the meta-positions only, leaving the ortho- and para-positions free. Examples of suitable substituted phenols are cresol, isopropylphenols, nonylphenols or dihydric phenols, such as bis-phenol F, hydroquinone, catechol and resorcinol. Use of substituted phenols will tend to alter the properties of any resulting phenolic resin which is derived from the resulting product, such property changes being of the kind which allows for a maximum variety of phenolic resin product types. For example, a halogen substitution should enhance the flame retardancy of the resultant phenolic resin. If mixtures of phenols are used, the mixtures preferably contain phenol.

The reaction is carried out at a temperature of from about 30° C. to about 100° C. as desired to achieve a phenolic resin possessing the desired properties for the anticipated application. Such is within the skill of the art. Preferably, the temperature is controlled within the range of about 45° C. to about 75° C. Any method known to those skilled in the art for controlling the temperature can be used such as direct cooling using cooling coils immersed in the reaction mixture, indirect cooling using a jacketed reactor, or by conducting the reaction at reflux under a vacuum. The reaction time normally will range from about one (1) to about six (6) hours.

In the embodiment where an electropositive divalent metal catalyst is used as the ortho directing catalyst, a metal cation scavenger is added once the reaction is completed to the extent desired. The scavenger reacts, complexes or combines with the metal cation and the resulting insoluble metal cation product is removed from the resin, e.g. the scavenger has an anion that renders the metal cation insoluble and precipitates or is filtered out. After the divalent metal cation is removed and the pH adjusted by using an alkali metal base, a water soluble borate salt is added to the aqueous phenolic resin. The borate is added in an amount ranging from about 0.02 and about 0.5 mole of water soluble borate per mole of phenol, and preferably ranging from about 0.05 and about 0.3 mole borate per mole of phenol. Suitable water soluble borates include lithium metaborate ($LiBO_2$), sodium metaborate ($NaBO_2$), and potassium metaborate ($KBO_2$).

It also is possible to form the necessary borate salt in situ by reacting boric acid ($H_3BO_3$) or borax ($Na_2B_4O_7-10 H_2O$) with an alkali metal hydroxide such as sodium hydroxide. Neutralizing each mole of boric acid requires one mole of alkali metal hydroxide, while neutralizing each mole of borax requires two moles of hydroxide to form the metaborate salts. It must be remembered that the hydroxide needed to neutralize the borate source is in addition to that needed to maintain the desired basic conditions in the phenolic resin composition. After addition or in situ formation of the borate salt and any additional alkali metal hydroxide, the pH of the aqueous phenolic resin composition will be at least about 7. Typically, the pH of the resin composition will range from about 8 to about 10.5, and usually will range from about 8 to about 9.

The phenol/formaldehyde reaction product is an aqueous mixture. The water content thereof generally ranges from about 10 to about 65 weight percent, and is usually no more than about 35 to about 60 weight percent. Water may be introduced to the system with the formaldehyde, which is usually added as an aqueous solution, or with the catalyst which is usually added as a preformed aqueous solution or dispersion, e.g. suspension. Varying amounts of water also may be formed as a by-product during the reaction. Concentrating the liquid resin product to a particular predetermined water content is readily accomplished by conventional stripping at reduced pressure such as, for example, at a reduced absolute pressure from about one to about 200 mm of mercury absolute and at temperatures from about 30° C. to about 75° C. In such a manner, the resin is dehydrated to about 60 to 99 percent solids, preferably to about 60 to about 85 percent solids.

The specific nature of the resulting phenolic resole resin, such as its molecular weight, is not narrowly critical. Normally, what is preferred in terms of resin viscosity and the like depends to some extent on the process used to make the reinforced composite product. For example and preferably, the phenolic resin preparation reaction can be controlled to produce primarily monomeric methylol phenols, with small amounts of dimeric and trimeric methylol species. Alternatively, the reaction can be continued until a resin with an average molecular weight of 1000 or more is obtained.

Other conventional binder additives compatible with the phenolic resin composition may be added to the binder. Such additives include formaldehyde scavengers, such as ammonia and urea.

The binder composition of this invention may comprise a variety of liquid forms, including solutions, miscible liquids, or dispersions and the like and combinations of such liquid forms depending upon the optional ingredients blended into the binder composition. Where the term solution or any of the variations thereof is used herein it is intended to include any relatively stable liquid phase.

Suitable fibers are well known to those skilled in the art and include inorganic fibers, organic fibers and combinations thereof. Examples of such fibers are glass fibers, mineral wool, carbon fibers, aramid fibers and other thermoplastic fibers and cellulose fibers. Honeycombed reinforcing components are also well known to those skilled in the art. See, for example, Nomex® honeycomb blocks available from CibaGeigy (an aramid material).

The binder can be applied to, for example, glass fibers by flooding or dipping the collected mat of glass fibers and draining off the excess, by applying the binder composition onto the glass fibers during mat formation, by spraying the glass fiber mat or the like. For prepregs, the layer of fiber with binder is dried in a manner to minimize cure, i.e. to a B-stage. A plurality of the prepregs are then layered and then compressed and shaped into the form and dimensions of the desired end product and heated until the binder is cured in a conventional manner, thus fixing the size and shape of the finished product by bonding the prepregs to one to another and forming an integral composite structure. The glass fiber component will represent the principal material of a glass insulation product. Usually from about 99 to about 60 percent by weight of the product will be composed of the glass fibers while the amount of cured binder will be in reverse proportion, i.e., from about 1 to about 40 percent, depending upon the density and character of the product. A prepreg for making laminates typically contains from about 20 to about 60 percent cured binder.

The binder may also be used as a saturating composition for honeycombed structures. Such structures are of a material which can be stretched. In its stretched condition, it is dipped into the composition and after allowing any excess to drain the resulting coating is cured. The process is repeated until the desired resin content is achieved. At this point, the stretching force on the structure is removed with the cured coating maintaining the structure in its stretched form. The cured resin maintains the rigidity and adds strength to the honeycombed structure.

EXAMPLE A

Control; Comparative Example

A reactor equipped with an agitator, reflux condenser, and means for establishing vacuum was charged with phenol and formaldehyde in a formaldehyde to phenol molar ratio (F/P) of about 1.85:1. Formaldehyde was added as a 50% aqueous solution. Sodium hydroxide (caustic) in an amount of about 0.053 mole per mole of phenol was slowly added to the reactor while maintaining its contents under a condition of vacuum reflux at about 55° C. Once the caustic addition was completed, the reaction solution was heated slowly to about 65° C. over about 60 minutes. The reaction was continued at about 65° C. for up to about 260 minutes until the free formaldehyde fell to less than about 1.75% by weight based on the total composition. The resin was cooled to about 55° C. and the pH adjusted to about 8.5 with sodium hydroxide. The mixture was vacuum distilled at about 55° C. until a final nonvolatile solids content of about 65% was achieved.

EXAMPLE B

Borate Formed in situ

A reactor equipped with an agitator, reflux condenser, and means for establishing vacuum was charged with phenol and formaldehyde in a molar ratio (F/P) of about 1.85:1. Formaldehyde was added as a 50% aqueous solution. Calcium hydroxide (lime) in an amount of about 0.053 equivalent mole of hydroxide per mole of phenol was slowly added to the reactor while maintaining its contents under a condition of vacuum reflux at about 55° C. Once the lime addition was completed, the reaction solution was heated slowly to about 65° C. over about 60 minutes. The reaction was continued at about 65° C. for up to about 260 minutes until the free formaldehyde fell to less than about 1.75%. The resin was cooled to about 55° C. Carbon dioxide gas was sparged through the solution until a pH of about 7.0 was achieved. The carbon dioxide gas, a calcium ion scavenger, reacted with the calcium ions to form the precipitate calcium carbonate. About 0.5 wt % of a 10% aqueous solution of Separan® NP10 flocculating agent (available from Dow Chemical Co.; a synthetic water-soluble, nonionic, high molecular weight polymer of acrylamide) was added to the neutralized mixture, stirred, and allowed to settle. The supernatant resin solution was separated from the solids. The pH of the clean resin (substantially free of calcium ions) was adjusted to about 8.5 with sodium hydroxide. The mixture was then vacuum distilled at about 55° C. until a final non-volatile solids content of about 65% was achieved.

EXAMPLE C

Borate Added During Reaction

A reactor equipped as in Examples A and B was charged with phenol and formaldehyde in a formaldehyde to phenol molar ratio (F/P) of about 1.5:1. The formaldehyde was charged as a 50% aqueous solution. About 3% by weight based on the total charge of sodium metaborate was added and sufficient 50% aqueous sodium hydroxide to give a mole ratio (NaOH/phenol) of about 0.054:1. The mixture was heated to about 65° C. and held until the free formaldehyde fell to less than about 1.75%. The mixture was cooled to about 55° C. and distilled under vacuum to a non-volatile solids content of about 65%.

EXAMPLE D

Comparative Example

To the resin from Example A was added 1%, 2%, 3%, 5%, 7% and 10% by weight boric acid based on the total composition, respectively, and pH adjusted to about 8.5 with sodium hydroxide. The added boric acid reacts with its stoichiometric portion of the sodium hydroxide to produce sodium borate in situ.

Figure 1:
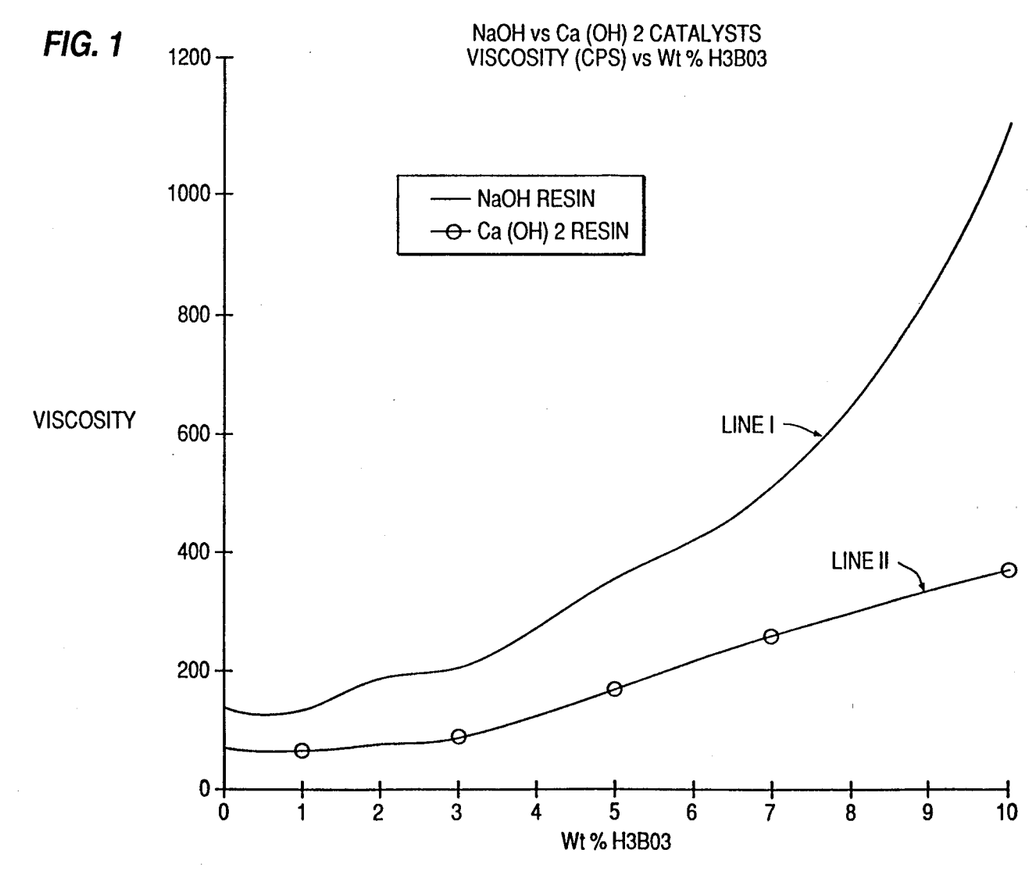
FIG. 1 is a graph of viscosity versus weight percent of boric acid added a prior art resin (Line I) and a resin according to the present invention (Line II).
Figure 2:
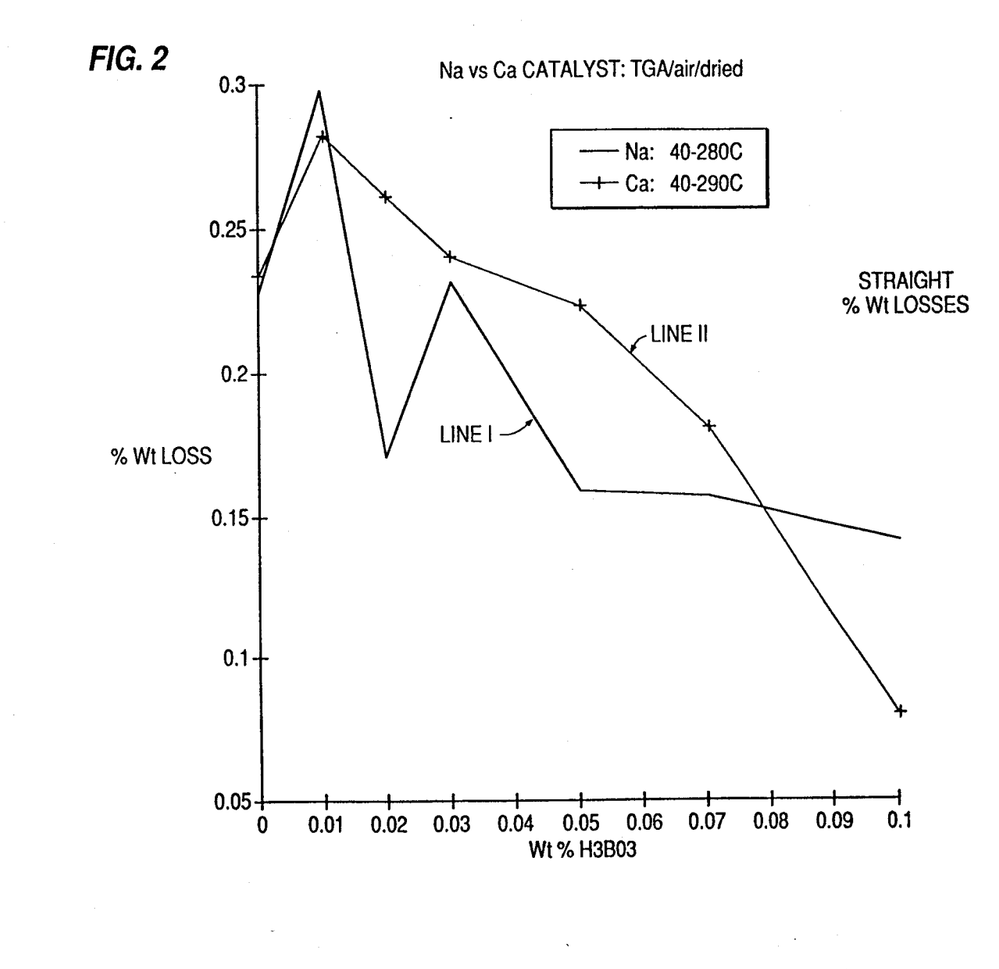
FIG. 2 is a graph of thermogravimetric data (TGA) wherein percent weight loss is plotted versus weight percent boric acid added to a prior art resin (Line I) and a resin of the present invention (Line II).

These represent the control resins according to the Conner et al. patent (U.S. Pat. No. 5,032,431). As shown in FIG. 1 Line I, the Brookfield viscosity range for these products was from about 150 cps (zero boric acid) to about 1100 cps at the 10% boric acid level. Thermogravimetric data (TGA) was obtained on these products as well and is shown in FIG. 2 Line II. For the TGA data, a sample of resin is taken at different stages of the reaction. The free water is removed and the remaining material freeze dried. This freeze-dried material is then weighed and becomes the sample weight. The sample is then heated with its weight being recorded during the heating cycle (See e.g. FIG. 2). The weight loss represents volatiles evolved.

EXAMPLE E

Post Reaction Addition of Borate

To the resin of Example B was added 1%, 2%, 3%, 5%, 7%, and 10% by weight boric acid based on the total composition, respectively, and the pH adjusted to about 8.5 with sodium hydroxide. As shown in FIG. 1 Line II, the viscosity range for these products was from about 100 cps (zero boric acid) to about 320 cps at the 10% boric acid level. TGA data was obtained on these products and is shown in FIG. 2 line II.

EXAMPLE F

Reaction and Post-Reaction Addition of Borate

To the resin of Example C, which already contained 3% borate added during the reaction, was added 1% and 3% boric acid (for a total of 4% and 6% borate), respectively, and the pH adjusted to about 8.5 by adding sodium hydroxide (forming the desired borate in situ with the added boric acid). The viscosity for Samples F4 (4% borate) and F6 (6% borate) was about 150 cps and about 200 cps, respectively, compared to a viscosity of about 130 cps for the product of Example C (3% borate).

EXAMPLE G

Storage Life Data

Storage life data were obtained for some of these products at 25° C. and 35° C. The products modified with borates according to the present invention all retained greater than about 100:1 water dilutability for up to 45 days at both temperatures, while a control resin (Example A) with zero boric acid treatment gave a water dilutability of less than about 20:1 after 17 days at 25° C. and after 5 days at 35° C. This surprising increase in storage stability was not expected and is of benefit to applications requiring long storage times and the complete absence of organic solvents.

EXAMPLE H

Strength Data

The product from Example C was used to prepare glass laminates in accordance with protocol set forth by MIL-R-9299c specifications Dec. 3, 1968). The resin was prepregged using a conventional solution process using 7781 glass fabric (available from BGF Industries) with A-1100 soft finish (a silane coupling agent, an amino propyl triethoxy silane available from Union Carbide Corporation). Fourteen (14) plies (18 inches by 36 inches) of that prepregging were used and cured and compressed at about 325° F. under about 250 psi pressure for about ten (10) minutes. Test specimens were then prepared and tested using an Instron tester in a 3 point compression mode. The results are given in Table I (room temperature flexural properties per ASTM D-790), II (room temperature compression properties per ASTM D-695), and III (room temperature tensile properties per ASTM D-638).

TABLE I

| (room temp flexural properties) | | |
|---|---|---|
| Test | Example A (Zero Boric Acid) | Example C |
| Flexural Strength (psi) | 48,130 | 84,500 |
| Flexural Modulus (psi × $10^{-6}$) | 2.65 | 3.70 |
| Resin Content (%) | 34.9 | 34.7 |
| Laminate Thickness (inches) | 0.137 | 0.137 |

14 plies cured at 325° F. for 10 minutes under 250 psi.
Specimen = 1" × 3", crosshead speed = 0.05 inches/min., span = 2 inches

TABLE II

| (room temperature compression properties) | | |
|---|---|---|
| Test | Example A (Zero Boric Acid) | Example C |
| Compressive Strength (psi) | 38,270 | 87,980 |
| Compressive Modulus (psi × $10^{-6}$) | 2.65 | 3.70 |
| Resin Content (%) | 34.9 | 34.7 |
| Laminate Thickness (inches) | 0.137 | 0.137 |

14 plies cured at 325° F. for 10 minutes under 250 psi.
Specimen = dog bone, speed = 0.05 inches/min.

TABLE III

| (room temperature tensile properties) | | |
|---|---|---|
| Test | Example A (Zero Boric Acid) | Example C |
| Tensile Strength (psi) | 59,340 | 63,870 |
| Tensile Modulus (psi × $10^{-6}$) | 2.74 | 3.84 |
| Tensile Elongation (%) | 2.2 | 2.4 |
| Resin Content (%) | 34.9 | 34.7 |
| Laminate Thickness (inches) | 0.137 | 0.137 |

TABLE III-continued

| (room temperature tensile properties) | | |
|---|---|---|
| Test | Example A (Zero Boric Acid) | Example C |

14 plies cured at 325° F. for 10 minutes under 250 psi.
Speed = 0.2 inches/min., specimen = dog bone Type I.

EXAMPLE I

Flame and Smoke Data

Prepregs were prepared using a conventional solution process from unsized woven glass (gray goods) using the resin from Example C at about 32.5% resin content. Six-ply zero degree laminates having a thickness of about 0.054 inches were produced by pressing and curing at about 325° F. for about ten (10) minutes under about 250 psi pressure. The OSU heat release, NBS smoke test, and flammability tests were performed on these laminates. The results were:

NBS Smoke (F-814; specimen=3"×3") (optical density @4 min.)=1

OSU (Ohio State University heat release value (ASTM E-906, specimen=6"×6")) (2 min heat release/max heat release)=8/35 $Kw$-min-$m^{-2}$/$Kw$-$m^{-2}$

| Flammability (FAR 25.853A, specimen = 0.5" × 6") | |
|---|---|
| Self extinguishing time (sec) | = <1 |
| Burn length (inches) | = 1.5 |
| Drip extinguishing time (sec) | = No drip |

Standard unmodified phenol-formaldehyde resin under identical conditions gave equivalent results.

The data displayed in the tables and figures clearly demonstrate the enhancement of properties expected using the products of this invention for reinforced composites.

The use of phenolic resole resins containing increased ortho methylol groups have resulted in overcoming the viscosity problems associated with the Conner et al. procedures when borates are added, particularly at higher loadings. Also, the unexpected improvements in strength, storage life, and reduced volatile emissions (see TGA data) during cure have been substantiated.

Although the technology disclosed here suggests the use of water-based resins, the property enhancements have been shown to function in solvent based systems as well.

Since viscosity is a manifestation of the structure of the resin, it is clear that the chemical nature of products of the present invention are unique and separate from those of the prior art, particularly from the disclosure of Conner et al. and from those commercially available resoles.

Although the invention has been described in its preferred forms with a certain degree of particularity, it is understood from has been made only by way of example and that numerous changes may be made without departing from the spirit and the scope of the invention.

What is claimed is:

1. A phenolic resin composition comprising an aqueous mixture of:
   (a) a resole formed by reacting phenol with formaldehyde in the presence of an ortho directing catalyst at a mole ratio of formaldehyde to phenol ranging from about 0.7:1 to about 3:1, and
   (b) a water-soluble borate, wherein said composition contains at least about 0.02 equivalent of the ortho directing catalyst per mole of phenol, has a pH at least about 7 and contains from about 0.02 to about 0.5 mole borate per mole of phenol, with the proviso that when said ortho directing catalyst has a cation that forms an insoluble material with a borate anion, said cation is removed after said resole is formed and prior to adding said water-soluble borate.

2. The composition of claim 1, wherein said mole ratio of formaldehyde to phenol ranges from about 1.0:1 to about 1.8:1.

3. The composition of claim 1, wherein said composition contains from about 0.02 to about 0.3 mole borate per mole of phenol.

4. The composition of claim 1, wherein said ortho directing catalyst is an electropositive divalent metal catalyst.

5. The composition of claim 1, wherein said ortho directing catalyst is an ortho directing borate catalyst.

6. A method of making a reinforced composite which comprises:
   (1) coating reinforcing components with an aqueous binder composition having a pH at least about 7 comprising an aqueous mixture of:
      (i) a resole formed by reacting phenol with formaldehyde in the presence of an ortho directing catalyst at a mole ratio of formaldehyde to phenol ranging from about 0.7:1 to about 3:1, and
      (ii) a water-soluble borate,
   wherein said composition contains at least about 0.02 equivalent of the ortho directing catalyst per mole of phenol, has a pH at least about 7 and contains from about 0.02 and about 0.5 mole borate per mole of phenol;
   (2) drying said coated reinforcing component with minimal curing of said binder to form a prepreg;
   (3) forming a structure with at least one of said prepregs; and
   (4) applying pressure and heat to said structure to cure said dried binder into a matrix forming said composite.

7. The method of claim 6, wherein said forming step comprises layering a plurality of said prepregs to form said structure.

8. The method of claim 6, wherein said mole ratio of formaldehyde to phenol ranges from about 1.0:1 to about 1.8:1.

9. The method of claim 6, wherein said binder composition contains from about 0.02 to about 0.3 mole borate per mole of phenol.

10. The method of claim 6, wherein said ortho directing catalyst is an electropositive divalent metal catalyst, and said method for preparing said phenolformaldehyde reaction product further comprising adding an anion to render said divalent metal insoluble and removing same prior to adding said water soluble borate in said binder composition.

11. A method of making a reinforced composite which comprises:
   (1) coating a honeycombed reinforcing component with an aqueous binder composition having a pH at least about 7 comprising an aqueous mixture of:
      (i) a resole formed by reacting phenol with formaldehyde in the presence of an ortho directing catalyst at a mole ratio of formaldehyde to phenol ranging from about 0.7:1 to about 3:1, and
      (ii) a water-soluble borate,
   wherein said composition contains at least about 0.02 equivalent of the ortho directing catalyst per mole of phenol, has a pH at least about 7 and contains from about 0.02 and about 0.5 mole borate per mole of phenol;
   (2) curing the binder coating on said coated reinforcing component; and
   (3) repeating steps (1) and (2) until a desired cured binder content in said honeycombed reinforcing member is achieved forming said composite.

12. The method of claim 11, wherein said mole ratio of formaldehyde to phenol ranges from about 1.0:1 to about 1.8:1.

13. The method of claim 11, wherein said binder composition contains from about 0.02 to about 0.3 mole borate per mole of phenol.

14. The method of claim 11, wherein said ortho directing catalyst is an electropositive divalent metal catalyst, and said method for preparing said phenolformaldehyde reaction product further comprising adding an anion to render said divalent metal insoluble and removing same prior to adding said water soluble borate in said binder composition.

15. The method of claim 11, wherein said honeycombed reinforcing component is of a stretchable material and said method further comprising
   applying a stretching force to said honeycombed reinforcing component and stretching said honeycombed reinforcing component to the desired extend and shape prior to the coating step.

16. The method of claim 15, wherein once the coating and curing steps are completed, releasing the stretching force on the reinforcing component.

17. A reinforced composite made in accordance with the method of claim 6.

18. A reinforced composite made in accordance with the method of claim 11.

19. A method for preparing a phenolic resole resin composition comprising:
   (a) reacting a phenol with an aldehyde in the presence of an ortho directing catalyst at a mole ratio of said aldehyde to said phenol ranging from about 0.7:1 to about 3:1 and
   (b) adding or forming in situ a water-soluble borate, wherein said composition contains at least about 0.02 equivalent of the ortho directing catalyst per mole of said phenol, has a pH at least about 7 and contains from about 0.02 to about 0.5 mole borate per mole of said phenol,
   with the proviso that when said ortho directing catalyst has a cation that forms an insoluble material with a borate anion, said cation is removed after said resole is formed and prior to adding said water-soluble borate.

20. The method of claim 19, wherein said phenol is phenol itself and said aldehyde is formaldehyde.

21. The method of claim 19, wherein said mole ratio of said aldehyde to said phenol ranges from about 1.0:1 to about 1.8:1.

22. The method of claim 19, wherein said composition contains from about 0.02 to about 0.3 mole borate per mole of said phenol.

23. The method of claim 19, wherein said ortho directing catalyst is an electropositive divalent metal catalyst and said method further comprises adding an anion which renders the divalent metal cation of said catalyst insoluble and then removing the insoluble product formed between the anion and the metal cation prior to adding the water soluble borate to the composition.

* * * * *